(12) United States Patent
Carlson (10) Patent No.: US 9,327,729 B2
(45) Date of Patent: May 3, 2016

(54) DEVICE AND METHOD FOR IMPROVEMENT IN SAFETY OF DPF REGENERATION

(71) Applicant: Scania CV AB, Södertälje (SE)

(72) Inventor: Peter Carlson, Södertälje (SE)

(73) Assignee: SCANIA CV AB (SE)

( * ) Notice: Subject to any disclaimer, the term of this patent is extended or adjusted under 35 U.S.C. 154(b) by 51 days.

(21) Appl. No.: 14/386,068

(22) PCT Filed: Mar. 13, 2013

(86) PCT No.: PCT/SE2013/050232
§ 371 (c)(1),
(2) Date: Sep. 18, 2014

(87) PCT Pub. No.: WO2013/141779
PCT Pub. Date: Sep. 26, 2013

(65) Prior Publication Data
US 2015/0073669 A1     Mar. 12, 2015

(30) Foreign Application Priority Data

Mar. 20, 2012 (SE) ..................... 1250264

(51) Int. Cl.
| | |
|---|---|
| B60W 10/06 | (2006.01) |
| B60W 30/18 | (2012.01) |
| B60T 7/12 | (2006.01) |
| F02D 41/02 | (2006.01) |
| F01N 3/023 | (2006.01) |
| B60W 10/11 | (2012.01) |
| B60W 10/18 | (2012.01) |
| B60W 40/068 | (2012.01) |

(52) U.S. Cl.
CPC ............ *B60W 30/18054* (2013.01); *B60T 7/12* (2013.01); *B60W 10/06* (2013.01);
(Continued)

(58) Field of Classification Search
CPC ................. B60W 30/18054; B60W 30/18109; B60W 10/11; B60W 10/06; B60W 10/182; F01N 3/023; F02D 41/029; B60T 7/12
USPC .............. 477/100, 115, 184, 187; 701/53, 78; 60/295, 278
See application file for complete search history.

(56) References Cited

U.S. PATENT DOCUMENTS

| | | | |
|---|---|---|---|
| 9,027,327 B2 * | 5/2015 | Johnson | 60/295 |
| 2004/0044457 A1 | 3/2004 | Kolmanovsky et al. | 701/54 |

(Continued)

FOREIGN PATENT DOCUMENTS

WO   WO 2007/145553 A1   12/2007

OTHER PUBLICATIONS

International Search Report mailed Jun. 26, 2013 in corresponding PCT International Application No. PCT/SE2013/050232.

*Primary Examiner* — Roger Pang
(74) *Attorney, Agent, or Firm* — Ostrolenk Faber LLP (57) ABSTRACT

A method for safety improvement when a motor vehicle (100) having a power train with an engine (230), automatic gearbox (240) and torque converter (237) is stationary and particle filter (320) for the exhaust gases of the engine (230) is being regenerated; The step of applying safety brake action to keep the vehicle (100) stationary despite torque transfer being maintained in the power train. The step of choosing in the gearbox (240) a gear step which is higher than an initial gear step of the gearbox (240) in order to reduce the torque transferred to the vehicle's tractive wheels (247a, 247b) when the vehicle is thus kept stationary. Also a computer program product with program code (P) for a computer (200; 210) for implementing the method. Also a device for safety improvement when a motor vehicle (100) is stationary and a particle filter (320) for the exhaust gases of the engine (230) is being regenerated. Also, a motor vehicle (100) equipped with the device.

21 Claims, 4 Drawing Sheets

(52) U.S. Cl.
CPC ............ *B60W 10/11* (2013.01); *B60W 10/182* (2013.01); *B60W 30/18027* (2013.01); *B60W 30/18109* (2013.01); *B60W 40/068* (2013.01); *F01N 3/0238* (2013.01); *F02D 41/029* (2013.01); *F02D 2400/12* (2013.01)

(56) References Cited

U.S. PATENT DOCUMENTS

| | | | |
|---|---|---|---|
| 2006/0266017 A1 | 11/2006 | Kresse | 60/274 |
| 2007/0251220 A1 | 11/2007 | Dawson et al. | 60/295 |
| 2008/0093153 A1* | 4/2008 | Gudorf | B60W 10/06 180/309 |
| 2009/0019838 A1 | 1/2009 | Marlett et al. | 60/287 |
| 2009/0222191 A1 | 9/2009 | Andrasko | 701/102 |
| 2009/0301061 A1 | 12/2009 | Sahlen et al. | 60/285 |
| 2011/0126520 A1 | 6/2011 | Kim | 60/278 |
| 2012/0227379 A1* | 9/2012 | Koestler | F01N 3/023 60/274 |
| 2015/0300277 A1* | 10/2015 | Stenlس | F02D 41/1444 701/110 |

\* cited by examiner

DEVICE AND METHOD FOR IMPROVEMENT IN SAFETY OF DPF REGENERATION

CROSS-REFERENCE TO RELATED APPLICATIONS

The present application is a 35 U.S.C. §§371 National Phase conversion of PCT/SE2013/050232, filed Mar. 13, 2013, which claims priority of Swedish Patent Application No. 1250264-7, filed Mar. 20, 2012, the contents of which are incorporated by reference herein. The PCT International Application was published in the English language.

TECHNICAL FIELD

The present invention relates to a method for safety improvement when a motor vehicle is stationary and a particle filter for the engine's exhaust gases is being regenerated. The invention relates also to a computer programme product comprising programme code for a computer for implementing a method according to the invention. It relates also to a device for safety improvement when a motor vehicle is stationary and a particle filter for the engine's exhaust gases is being regenerated, and to a motor vehicle equipped with the device.

BACKGROUND

Vehicles today are increasingly being equipped with a particle filter to filter exhaust gases from their engines. These filters can be regenerated at suitable intervals of time, which involves raising the temperature of the vehicle's exhaust gases by dosing a combustible substance to the exhaust system upstream of the filter. Said temperature raising takes place when the combustible substance burns.

The time required for a regeneration procedure may for example be 30-60 minutes, during which it is therefore desirable that the temperature of the exhaust gases be above a lowest necessary temperature.

When a vehicle provided with a two-pedal system, a power train with automatic gearbox and torque converter is stationary, certain vehicle brakes may be applied when the vehicle is in what is usually called a "drive" state which the driver has put the vehicle's control system into by means of a mode selector. The braking action of the brakes may prevent the vehicle from moving off. To keep the vehicle stationary, the braking action needs to be greater than the propulsive force imparted to the vehicle's tractive wheels by torque transmitted from the engine.

In a typical application, e.g. in buses, so-called stopping-place brakes are activated where the vehicle comes temporarily to a halt at stopping places along a certain route. During a regeneration of the particle filter, the power train will nevertheless transmit a certain torque to the vehicle's tractive wheels, since a certain load upon the engine is needed to maintain the temperature of the vehicle's exhaust gases. Regenerating the particle filter when the vehicle is stationary thus entails certain traffic safety risks.

US 2009/019838 describes a method for raising an exhaust temperature by increasing the load upon the vehicle's engine during regeneration of a particle filter. The output shaft from the vehicle's gearbox may be locked while at the same time a torque converter is operating.

US 2004044457 describes a method for regeneration of a particle filter of a vehicle.

SUMMARY OF THE INVENTION

There is need for a device whereby regeneration of a particle filter may be conducted in a stationary vehicle without impairment of traffic safety.

One object of the present invention is to propose a novel and advantageous method for safety improvement when a motor vehicle is stationary and a particle filter for the engine's exhaust gases is being regenerated.

Another object of the invention is to propose a novel and advantageous device and a novel and advantageous computer programme for safety improvement when a motor vehicle is stationary and a particle filter for the engine's exhaust gases is being regenerated.

A further object of the invention is to propose an alternative method, an alternative device and an alternative computer programme for safety improvement when a motor vehicle is stationary and a particle filter for the engine's exhaust gases is being regenerated.

These objects are achieved with a method for safety improvement when a motor vehicle is stationary and a particle filter for the engine's exhaust gases is being regenerated according to the present disclosure.

One aspect of the invention is a proposed method for safety improvement when a motor vehicle comprising a power train with an engine, automatic gearbox and torque converter is stationary and a particle filter for the engine's exhaust gases is being regenerated. The method comprises the steps of
  applying safety brake action to keep the vehicle stationary despite torque transmission being maintained in said power train, and
  choosing a gear step in said gearbox which is higher than an initial gear step of said gearbox in order to reduce the torque transmitted to the tractive wheels when the vehicle is thus kept stationary.

This makes it possible to maintain a necessary temperature of the vehicle's exhaust gases when the vehicle is stationary, and at the same time to reduce a torque transmitted to the tractive wheels, with consequent safety improvement during regeneration of the vehicle's particle filter.

The method may further comprise the steps of
  stopping said safety brake action, and thereafter
  choosing an initial gear step in said gearbox.

The step of choosing said higher gear step may further comprise choosing it on the basis of the gear configuration of said gearbox and a chosen initial gear step. A suitably higher gear step of the vehicle's gearbox may thus be chosen. It may be chosen such that a change to a chosen initial gear step will be as efficient as possible as regards both changeover time and gearbox wear associated with gear step changes.

The method may further comprise the step of
  choosing initial gear steps on the basis of characteristics of a currently determined surface on which the vehicle is travelling. A suitable initial gear step may thus be chosen, making it possible to choose an optimum torque for imparting to the tractive wheels in order to set the vehicle in motion.

The method may further comprise the step of
  choosing initial gear steps on the basis of information about a prevailing vehicle weight. A suitable initial gear step may thus be chosen, making it possible to choose an optimum torque for imparting to the tractive wheels in order to set the vehicle in motion.

The method may further comprise the step of
  choosing said higher gear step on the basis of information about a prevailing vehicle weight. A suitable higher initial gear step may thus be chosen, making it possible to apply an optimum brake force.

The method may further comprise the step of choosing initial gear steps on the basis of information about friction of a current surface on which the vehicle is travelling. A suitable initial gear step may thus be chosen, making it possible to choose an optimum torque for imparting to the tractive wheels in order to set the vehicle in motion.

The method may further comprise the step of choosing initial gear steps on the basis of information about gradients of a running surface on which the vehicle is travelling. A suitable initial gear step may thus be chosen, making it possible to choose an optimum torque for imparting to the tractive wheels in order to set the vehicle in motion.

The method may further comprise the step of choosing said higher gear step on the basis of information about gradients of a running surface on which the vehicle is travelling. A suitable higher initial gear step may thus be chosen, making it possible to apply an optimum brake force.

The step of choosing said higher gear step may further comprise choosing it on the basis of available safety brake action. This makes it possible to choose a suitable gear step appropriate to a prevailing available total brake action of the vehicle. A safe method for regenerating a particle filter of a stationary vehicle may thus be achieved.

The method may further comprise the step of determining available safety brake action on the basis of the vehicle's existing brake configuration. This makes it possible to choose a suitable higher gear step appropriate to a prevailing available total brake action of the vehicle. A safe method for regenerating a particle filter of a stationary vehicle may thus be achieved.

The method may further comprise the steps of determining a wear measurement for an existing brake configuration of the vehicle, and determining available safety brake action on the basis of said wear measurement determined.

The method is easy to implement in existing motor vehicles. Software for safety improvement when a motor vehicle is stationary and a particle filter for the engine's exhaust gases is being regenerated according to the invention may be installed in a control unit of the vehicle during the manufacture of the vehicle. A purchaser of the vehicle may thus have the possibility of selecting the function of the method as an option. Alternatively, software which comprises programme code for conducting the innovative method for safety improvement when a motor vehicle is stationary and a particle filter for the engine's exhaust gases is being regenerated may be installed in a control unit of the vehicle on the occasion of upgrading at a service station, in which case the software may be loaded into a memory in the control unit. Implementing the innovative method is therefore cost-effective, particularly as no further components need be installed in the vehicle. Relevant hardware is currently already provided on board. The invention thus represents a cost-effective solution to the problems indicated above.

Software which comprises programme code for safety improvement when a motor vehicle is stationary is easy to update or replace. Moreover, different parts of the software for safety improvement when a motor vehicle is stationary and a particle filter for the engine's exhaust gases is being regenerated may be replaced independently of one another. This modular configuration is advantageous from a maintenance perspective.

One aspect of the invention is a proposed device for safety improvement when a motor vehicle comprising a power train with an engine, automatic gearbox and torque converter is stationary and a particle filter for the engine's exhaust gases is being regenerated. The device comprises
    means for applying safety brake action to keep the vehicle stationary despite torque transmission being maintained in said power train, and
    means for choosing a gear step in said gearbox which is higher than an initial gear step of said gearbox in order to reduce the torque transmitted to the tractive wheels when the vehicle is thus kept stationary.

The device may further comprise
    means for choosing an initial gear step in said gearbox after cessation of said safety brake action.

The device may further comprise
    means for stopping said safety brake action, and
    means for choosing an initial gear step in said gearbox.

The device may further comprise
    means for choosing said higher gear step on the basis of the gear configuration of said gearbox and a chosen initial gear step.

The device may further comprise
    means for choosing initial gear steps on the basis of characteristics of a current surface determined on which the vehicle is travelling.

The device may further comprise
    means for choosing initial gear steps on the basis of information about a prevailing vehicle weight.

The device may further comprise
    means for choosing said higher gear step on the basis of information about a prevailing vehicle weight.

The device may further comprise
    means for choosing initial gear steps on the basis of information about friction of a current surface on which the vehicle is travelling.

The device may further comprise
    means for choosing initial gear steps on the basis of information about gradients of a running surface on which the vehicle is travelling. A suitable initial gear step may thus be chosen, making it possible to choose an optimum torque for imparting to the tractive wheels in order to set the vehicle in motion.

The device may further comprise
    means for choosing said higher gear step on the basis of information about gradients of a running surface on which the vehicle is travelling. This makes it possible to choose a suitable higher gear step whereby an optimum brake force may be applied.

The device may further comprise
    means for choosing said higher gear step on the basis of available safety brake action.

The device may further comprise
    means for determining available safety brake action on the basis of the vehicle's existing brake configuration.

The device may further comprise
    means for determining a wear measurement for an existing brake configuration of the vehicle, and
    means for determining available safety brake action on the basis of said wear measurement determined.

The above objects are also achieved with a motor vehicle which is provided with the device for safety improvement when the vehicle is stationary and a particle filter for the engine's exhaust gases is being regenerated. The vehicle may be a truck, bus or car.

One aspect of the present invention is a proposed computer programme for safety improvement when a motor vehicle comprising a power train with an engine, automatic gearbox and torque converter is stationary and a particle filter for the engine's exhaust gases is being regenerated, which program comprises program code stored on a computer-readable medium for causing an electronic control unit or another computer connected to the electronic control unit to perform steps according to the method herein.

One aspect of the present invention is a proposed computer program for safety improvement when a motor vehicle comprising a power train with an engine, automatic gearbox and torque converter is stationary and a particle filter for the engine's exhaust gases is being regenerated, which program comprises program code for causing an electronic control unit or another computer connected to the electronic control unit to perform steps according to the method herein.

One aspect of the present invention is a proposed computer program product comprising a program code stored on a computer-readable medium for performing method steps according to the method herein when the computer program is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations pertain to similar items in the various diagrams, and in which.

DETAILED DESCRIPTION OF THE DRAWINGS

Figure 1:
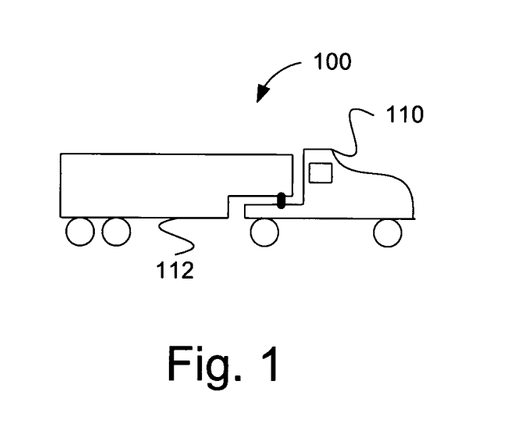
FIG. 1 schematically illustrates a vehicle according to an embodiment of the invention.

FIG. 1 depicts a side view of a vehicle 100. The exemplified vehicle 100 comprises a tractor unit 110 and a trailer 112. It may be a heavy vehicle, e.g. a truck or a bus. It may alternatively be a car.

The term "link" refers herein to a communication link which may be a physical connection such as an opto-electronic communication line, or a non-physical connection such as a wireless connection, e.g. a radio link or microwave link.

Figure 2:
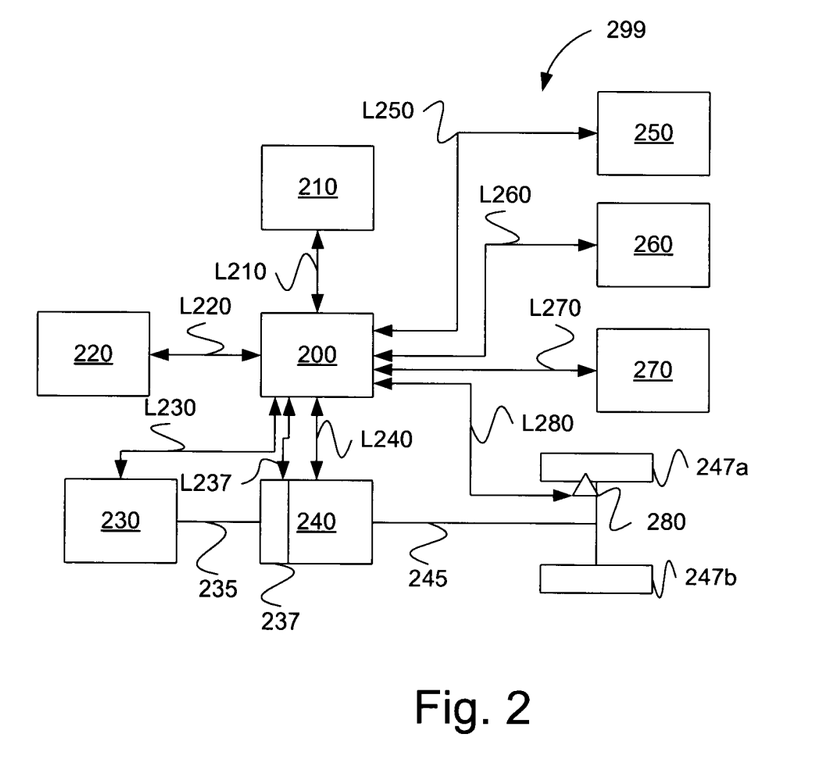
FIG. 2 schematically illustrates a subsystem for the vehicle depicted in FIG. 1, according to an embodiment of the invention.

FIG. 2 depicts a subsystem 299 of the vehicle 100. It is situated in the tractor unit 110.

The subsystem 299 comprises a first control unit 200 which is signal-connected to a pedal system 220 via a link L220. The pedal system may be a so-called two-pedal configuration comprising a brake pedal and an accelerator pedal which enable a driver to control the movement of the vehicle.

The subsystem 299 comprises an engine 230 which may be a combustion engine, e.g. a diesel engine. The engine is adapted to conveying torque to a gearbox 240 via a rotatably journalled shaft 235.

The gearbox 240 is an automatic gearbox comprising a torque converter 237 which in one example is integrated with the gearbox. The converter is adapted to transmitting in a controlled way to the gearbox a torque generated by the engine 230.

The gearbox 240 is adapted to transmitting a torque to tractive wheels 247a and 247b of the vehicle via an output shaft 245. The vehicle may of course alternatively be equipped with more than two, e.g. four or six, tractive wheels. Its transmission may further comprise a so-called final gear.

The first control unit 200 is arranged for communication with the engine 230 via a link L230 and is adapted to controlling the operation of the engine.

The first control unit 200 is arranged for communication with the torque converter 237 via a link L237 and is adapted to controlling the operation of the converter. It is adapted to automatically controlling a torque transfer by means of the converter.

The first control unit 200 is arranged for communication with the gearbox 240 via a link L240 and is adapted to controlling the operation of the gearbox. It is adapted to automatically changing gear steps in the gearbox. It is thus able to choose an initial gear step or another gear step of the gearbox. The gearbox may be configured to provide a suitable number of gear steps, e.g. 6, 10, 12 or 16 gear steps, thus presenting a certain gear configuration.

An initial gear step is a gear step which is part of a set of gear steps and is the usual gear step employed when setting the vehicle in motion from stationary. A combination of initial gear steps may for example comprise two existing lowest gear steps of the gearbox, which may be referred to as gear step 1 and gear step 2. In one example, a combination of initial gear steps may comprise four existing lowest gear steps of the gearbox, which may be referred to as gear step 1, gear step 2, gear step 3 and gear step 4.

The first control unit 200 is arranged for communication with, and adapted to controlling the operation of, a brake system (not depicted) of the vehicle.

A first sensor device 250 is provided to continuously determine a gradient of the running surface on which the vehicle is travelling. Said first sensor device may comprise an angle sensor adapted to determining a gradient of the running surface. In an alternative version, said first sensor 250 comprises a number of pressure sensors adapted to determining prevailing pressures in air bellows which are part of a suspension device of the vehicle. The first sensor device 250 is arranged for communication with the first control unit 200. The first control unit is adapted to using signals received from the first sensor device which contain information about said prevailing bellows pressures as a basis for determining a gradient of the running surface.

A second sensor device 260 is provided to continuously determine a friction coefficient My of the running surface on which the vehicle is travelling. Said second sensor device may comprise a running surface sensor adapted to determining features of the running surface, e.g. its icing state. In an alternative version, the first control unit is adapted to calculating a friction coefficient My of the running surface according to a stored model when the vehicle is in motion or stationary. The second sensor device is arranged for communication with the first control unit. The first control unit is adapted to using signals received from the second sensor device which contain information about said running surface as a basis for determining a friction coefficient My of the running surface.

A third sensor device 270 is provided to continuously determine a prevailing vehicle weight m. Said third sensor device may comprise at least one sensor adapted to determining a prevailing vehicle weight. Said at least one sensor may be an air pressure sensor adapted to determining a prevailing pressure in an air bellows which is part of a suspension device of the vehicle. A vehicle weight may thus be determined on the basis of said air bellows pressure determined. In an alternative version, the first control unit is adapted to calculating a prevailing vehicle weight according to a stored model when the vehicle is in motion or stationary. The third sensor configuration 270 is arranged for communication with the first control unit. The first control unit is adapted to using signals received from the third sensor device which contain for example information about said air bellows pressure as a basis for determining the vehicle's weight.

A fourth sensor device 280 is provided to continuously determine a prevailing wear measurement S of brakes (not depicted) in said brake system of the vehicle 100. Said fourth sensor device may comprise at least one optical sensor which may be adapted to determining a prevailing wear measurement S of a respective vehicle brake. Said at least one sensor may be a laser sensor. In an alternative version, the first control unit is adapted to calculating a prevailing wear measurement S of at least one vehicle brake of the vehicle according to a stored model when the vehicle is in motion or stationary. The fourth sensor device is arranged for communication with the first control unit via a link L280. The first control unit is adapted to receiving signals from the fourth sensor device which contain information about said wear measurement S. The first control unit is adapted to determining an available safety brake action on the basis of information about said prevailing wear measurement S.

The first control unit 200 is adapted to determining available safety brake action on the basis of an existing brake configuration of the vehicle. An available safety brake action is related for example to the type of brakes with which the vehicle is equipped. Information about the vehicle's brakes may be stored in a memory in the first control unit.

When a motor vehicle comprising a power train with an engine, automatic gearbox and torque converter is stationary and a particle filter for the engine's exhaust gases is being regenerated, the first control unit 200 is in one version adapted to applying safety brake action to keep the vehicle stationary despite torque transfer being maintained in said power train, and to choosing a gear step in said gearbox which is higher than an initial gear step of said gearbox, in order, when the vehicle is thus kept stationary, to reduce the torque transmitted to its tractive wheels. After cessation of said safety brake action, the first control unit is in one version adapted to choosing an initial gear step in said gearbox. In one version it is adapted to choosing said higher gear step on the basis of the gear configuration of said gearbox and a chosen initial gear step. In one version it is adapted to choosing initial gear steps on the basis of characteristics, e.g. a friction coefficient My determined, of a running surface determined on which the vehicle is travelling. In one version it is adapted to choosing initial gear steps on the basis of information about a prevailing vehicle weight m. In one version it is adapted to choosing a higher gear step on the basis of information about a prevailing vehicle weight m. In one version it is adapted to choosing initial gear steps on the basis of information about friction of a running surface on which the vehicle is travelling. In one version it is adapted to choosing said higher gear step on the basis of available safety brake action. In one version it is adapted to determining available safety brake action on the basis of the vehicle's existing brake configuration. In one version it is adapted to determining a prevailing gradient of a running surface on which the vehicle is travelling.

A second control unit 210 is arranged for communication with the first control unit 200 via a link L210. Said second control unit may be detachably connected to the first control unit. It may be external to the vehicle. It may be adapted to performing the innovative method steps according to the invention. It may be used to cross-load software to the first control unit, particularly software for conducting the innovative method. It may alternatively be arranged for communication with the first control unit via an internal network in the vehicle. It may be adapted to performing functions substantially similar to the first control unit, e.g. applying safety brake action to keep the vehicle stationary during regeneration of a particle filter of the vehicle, despite torque transfer being maintained in said power train, and choosing in the vehicle's gearbox a gear step which is higher than an initial gear step of said gearbox in order to reduce the torque transmitted to the tractive wheels when the vehicle is thus kept stationary.

Figure 3:
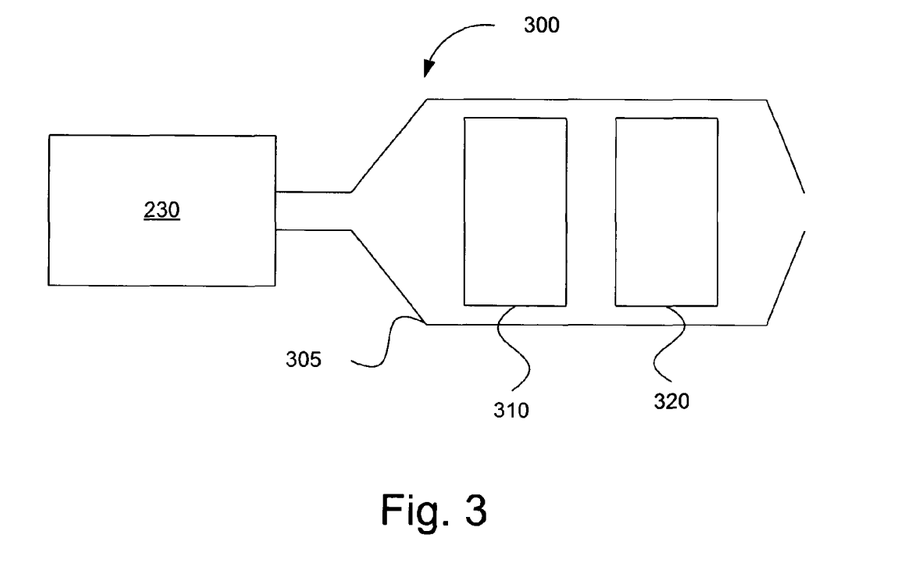
FIG. 3 schematically illustrates an exhaust system of a vehicle.

FIG. 3 depicts schematically an exhaust system 300 of a vehicle 100. The system comprises a passage 305 adapted to leading exhaust gases generated by the engine 230 to the vehicle's surroundings.

The passage 305 comprises a catalyst 310, e.g. an oxidation catalyst. A particle filter 320 is provided downstream of the catalyst in a conventional way and may be a diesel particle filter. It will need regenerating with a certain regularity and necessarily at relatively high exhaust temperatures. Dosing fuel into the passage 305 upstream of the catalyst 310 causes the temperature of the exhaust gases to rise when said dosed fuel burns. Active regeneration of the particle filter may thus be achieved, potentially reducing for example an existing amount of soot in the particle filter. The time required for a regeneration procedure may for example be 30 or 60 minutes. With advantage, the invention makes it possible for a temperature of the exhaust gases which is suitable for regeneration to be maintained when the vehicle is stationary.

Figure 4A:
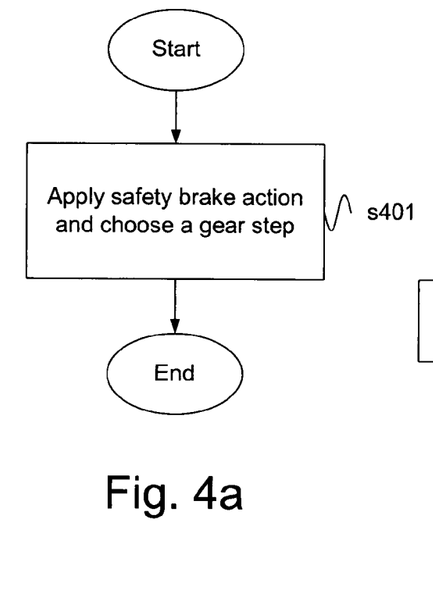
FIG. 4a is a schematic flowchart of a method according to an embodiment of the invention.

FIG. 4*a* is a schematic flowchart of a method for safety improvement when a motor vehicle comprising a power train with an engine, automatic gearbox and torque converter is stationary and a particle filter for the engine's exhaust gases is being regenerated, according to an embodiment of the invention. The method comprises a first step s401 comprising the steps of     applying safety brake action to keep the vehicle stationary despite torque transfer being maintained in said power train,     choosing in said gearbox a gear step which is higher than an initial gear step of said gearbox in order to reduce the torque transmitted to the tractive wheels when said vehicle is thus kept stationary. The method ends after step s401.

Figure 4B:
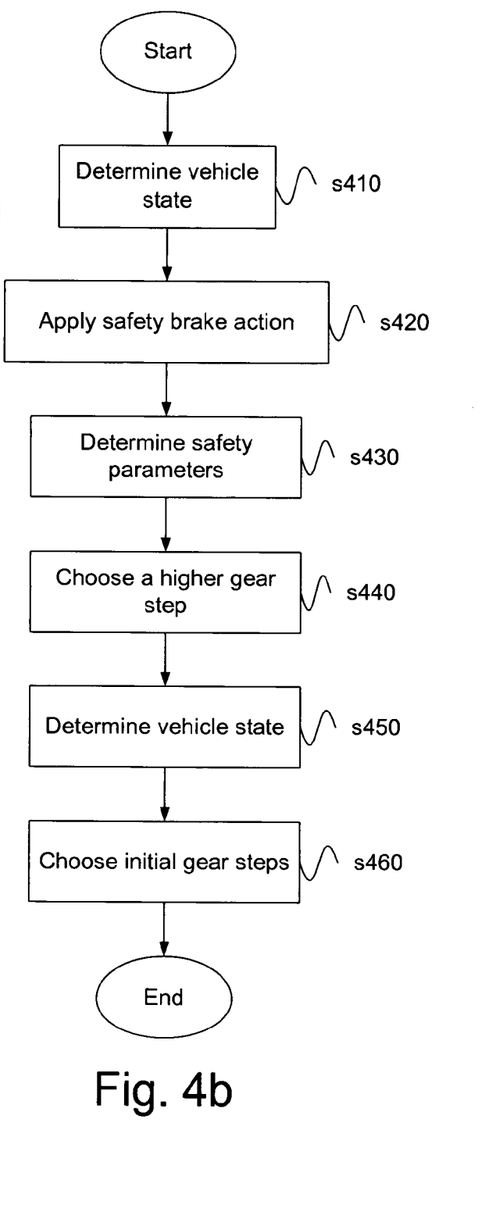
FIG. 4b is a more detailed schematic flowchart of a method according to an embodiment of the invention.

FIG. 4*b* is a schematic flowchart of a method for safety improvement when a motor vehicle comprising a power train with an engine, automatic gearbox and torque converter is stationary and a particle filter for the engine's exhaust gases is being regenerated, according to an embodiment of the invention.

The method comprises a first step s410 comprising the step of determining a prevailing vehicle state. This involves determining whether the vehicle is stationary and whether regeneration of the particle filter 320 is underway. It also involves determining whether a driver has put the vehicle's control system into what is usually called a "drive" state by means of a mode selector. If the vehicle is stationary and in "drive" mode and regeneration of the particle filter is underway, a subsequent step s420 is performed.

Method step s420 comprises the step of applying safety brake action to keep the vehicle stationary despite torque transfer being maintained in said power train. This may take place automatically, in which case vehicle brakes intended for the purpose are activated. These brakes may for example be so-called stopping-place brakes in cases where the vehicle is a bus. Thus a driver does not actively apply brake action by means of the pedal system 220. Step s420 is followed by a step s430.

Method step s430 comprises the step of determining safety parameters. It may comprise the step of determining available safety brake action on the basis of the vehicle's existing brake configuration. It may comprise the step of determining a friction coefficient My of the running surface on which the vehicle is travelling. It may comprise the step of determining a prevailing vehicle weight m. It may comprise the step of determining a gradient of the running surface. It may comprise the step of determining a preselected initial gear step which may be chosen by the first control unit 200 by means of a stored gear choice strategy. Step s430 may comprise the step of determining a wear measurement S. Step s430 may in one alternative version take place before step s420. It may in one alternative version take place before step s410. Step s430 is followed by a step s440.

Method step s440 comprises the step of choosing in said gearbox a gear step which is higher than a preselected initial gear step of said gearbox in order to reduce the torque transmitted to the tractive wheels when the vehicle is thus kept stationary. Step s440 may comprise the step of choosing said higher gear step on the basis of the gear configuration of said gearbox and a chosen initial gear step. It may comprise the step of choosing said higher gear step on the basis of available safety brake action. Step s440 may in one alternative version take place before step s420. Said higher gear step may be a highest gear step of the gearbox 240. Said higher gear step may for example be a seventh, eighth or tenth highest gear step of the gearbox. Said higher gear step may be chosen such that a change from it to an initial gear step takes place in a time-efficient way depending on the gear configuration of the gearbox. Step s440 is followed by a step s450.

Method step s450 comprises the step of determining vehicle state. This may involve determining whether said safety brake action applied ceases. Cessation of safety brake action may take place automatically when the driver uses the acceleration control which is part of the pedal system 220, with the intention of setting the vehicle in motion. Step s450 is followed by a step s460.

Method step s460 comprises the step of choosing initial gear steps of the vehicle's gearbox 240. This may involve a preselected initial gear step being engaged in the gearbox, and the torque converter 237 effecting increased torque transfer by the vehicle's transmission. The method may comprise the step of choosing initial gear steps on the basis of characteristics of a running surface determined on which the vehicle is travelling. It may comprise the step of choosing initial gear steps on the basis of information about a prevailing vehicle weight. It may comprise the step of choosing initial gear steps on the basis of information about friction of a current running surface. The method ends after step s460.

Figure 5:
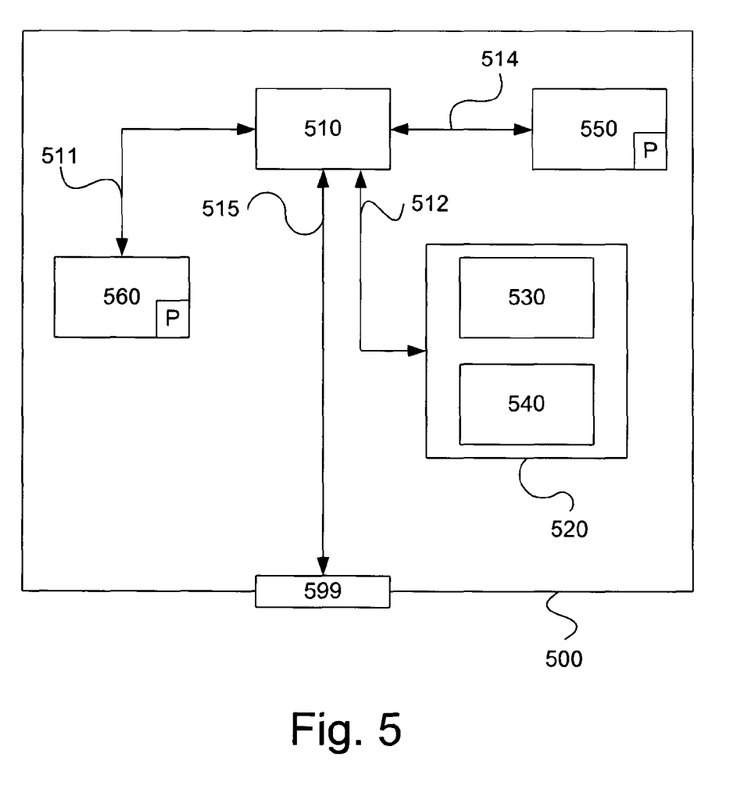
FIG. 5 schematically illustrates a computer according to an embodiment of the invention.

FIG. 5 is a diagram of a version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

A proposed computer programme P comprises routines whereby, when a motor vehicle comprising a power train with an engine, automatic gearbox and torque converter is stationary and a particle filter for the engine's exhaust gases is being regenerated, safety brake action is applied to keep the vehicle stationary despite torque transfer being maintained in said power train, and a gear step of said gearbox which is higher than an initial gear step of said gearbox is chosen in order, when the vehicle is thus kept stationary, to reduce the torque transmitted to its tractive wheels. The programme P comprises routines whereby, after cessation of said safety brake action, an initial gear step of said gearbox is chosen. The programme P comprises routines for choosing said higher gear step on the basis of the gear configuration of said gearbox and a chosen initial gear step. It comprises routines for choosing initial gear steps on the basis of characteristics, e.g. a friction coefficient My determined, of a running surface determined on which the vehicle is travelling. It comprises routines for choosing initial gear steps on the basis of information about prevailing vehicle weight m. It comprises routines for choosing initial gear steps on the basis of information about friction of a running surface on which the vehicle is travelling. It comprises routines for choosing said higher gear step on the basis of available safety brake action. It comprises routines for determining available safety brake action on the basis of the vehicle's existing brake configuration.

The computer programme P may be stored in an executable form or in compressed form in a memory 560 and/or in a read/write memory 550.

Where it is stated that the data processing unit 510 performs a certain function, it means that it conducts a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit via a data bus 514. The links L210, L220, L230, L237, L240, L250, L260, L270 and L280 for example may be connected to the data port (see FIG. 2).

When data are received on the data port 599, they are stored temporarily in the second memory element 540. When input data received have been temporarily stored, the data processing unit 510 will be prepared to conduct code execution as described above. In one version, signals received on the data port contain information about a wear measurement S of brakes of the vehicle. In one version, signals received on the data port contain information about vehicle weight m and/or a friction coefficient My and/or a gradient of the running surface on which the vehicle is travelling.

Parts of the methods herein described may be conducted by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and their practical applications and thereby make it possible for one skilled in the art to understand the invention for different embodiments and with the various modifications appropriate to the intended use.

The invention claimed is:

1. A method for safety improvement for a vehicle comprising a power train with an engine, an automatic gearbox, a torque converter, and a particle filter when the vehicle is stationary and when the particle filter for the exhaust gases of the engine is being regenerated, the method comprising the steps of:
    applying safety brake action to keep the vehicle stationary despite torque transfer being maintained in the power train; and
    choosing in the gearbox a gear step which is higher than an initial gear step of the gearbox.

2. A method according to claim 1, further comprising the subsequent steps of:
    stopping the safety brake action; and
    thereafter choosing an initial gear step in the gearbox.

3. A method according to claim 1, in which the step of choosing the higher gear step based on the gear configuration of the gearbox and a chosen initial gear step.

4. A method according to claim 2, further comprising the steps of:
    determining the running surface on which the vehicle is to travel; and
    choosing the initial gear steps on the basis of the determined characteristics of the running surface on which the vehicle is to travel.

5. A method according to claim 1, further comprising the step of choosing the initial gear steps based on information about a prevailing vehicle weight.

6. A method according to claim 1, further comprising the step of choosing initial gear steps based on information about friction of a running surface on which the vehicle is to travel.

7. A method according to claim 1, in which the step of choosing the higher gear is based on available safety brake action.

8. A method according to claim 7, further comprising the step of determining available safety brake action based on the vehicle's existing brake configuration.

9. A method according to claim 8, further comprising the steps of:
    determining a wear measurement for an existing brake configuration of the vehicle; and
    determining available safety brake action based on the wear measurement (S) determined.

10. A device for safety improvement when a motor vehicle is stationary, the vehicle comprising a power train with an engine, an automatic gearbox, a brake configuration, a torque converter and a particle filter for the exhaust gases of the engine during a time when the particle filter is being regenerated, the device comprising:
    means for applying safety brake action to keep the vehicle stationary despite torque transfer being maintained in the power train;
    means for choosing in the gearbox a gear step which is higher than an initial gear step of the gearbox.

11. A device according to claim 10, further comprising:
    means for stopping the safety brake action; and
    means for choosing an initial gear step in the gearbox.

12. A device according to claim 11, further comprising means for choosing the higher gear step based on the gear configuration of the gearbox and a chosen initial gear step.

13. A device according to claim 10, further comprising means for choosing initial gear steps based on determined characteristics of a running surface on which the vehicle is to travel.

14. A device according to claim 10, further comprising means for choosing initial gear steps based on information about a prevailing vehicle weight.

15. A device according to claim 10, further comprising means for choosing initial gear steps based on information about friction of a running surface on which the vehicle is to travel.

16. A device according to claim 11, further comprising means for choosing the higher gear step on the basis of available safety brake action.

17. A device according to claim 16, further comprising means for determining available safety brake action based on the vehicle's existing brake configuration.

18. A device according to claim 17, further comprising
    means for determining a wear measurement for an existing brake configuration of the vehicle; and
    means for determining available safety brake action based on the wear measurement determined.

19. A motor vehicle provided with a device according to claim 10.

20. A motor vehicle according to claim 19, which vehicle is a truck, a bus or a car.

21. A computer program product for safety improvement when a vehicle comprising a power train with an engine, automatic gearbox and torque converter is stationary and a particle filter for the exhaust gases of the engine is being regenerated, the computer program product comprises program code contained in a non-volatile, non-transitory computer-readable medium for causing an electronic control unit or another computer connected to the electronic control unit to perform steps according to claim 1 when the program code is run on an electronic control unit or another computer connected to the electronic control unit.

* * * * *